United States Patent [19]

Hose, Jr. et al.

[11] Patent Number: 5,627,991
[45] Date of Patent: May 6, 1997

[54] CACHE MEMORY HAVING A MULTIPLEXOR ASSEMBLY FOR ORDERING OUTPUT ON A DATA CHUNK BASIS

[75] Inventors: R. Kenneth Hose, Jr., Aloha, Oreg.; Jeffrey L. Miller, Vancouver, Wash.; David P. DiMarco, Hillsborough, Oreg.

[73] Assignee: Intel Corporation, Santa Clara, Calif.

[21] Appl. No.: 600,466

[22] Filed: Feb. 12, 1996

Related U.S. Application Data

[63] Continuation of Ser. No. 175,199, Dec. 28, 1993, abandoned.

[51] Int. Cl.$^6$ .................................................. G06F 12/08
[52] U.S. Cl. .................. 395/456; 395/871; 395/421.01
[58] Field of Search ............................ 395/403, 421.01, 395/445–473, 494, 871

[56] References Cited

U.S. PATENT DOCUMENTS

| | | | |
|---|---|---|---|
| 4,360,891 | 11/1982 | Branigin et al. | 395/375 |
| 4,424,561 | 1/1984 | Stanley et al. | 395/403 |
| 4,482,979 | 11/1984 | May | 395/433 |
| 4,747,043 | 5/1988 | Rodman | 395/451 |
| 4,992,934 | 2/1991 | Portanova et al. | 395/375 |
| 5,119,324 | 6/1992 | Ahsan | 364/736 |
| 5,136,701 | 8/1992 | Kawai et al. | 395/847 |
| 5,142,668 | 8/1992 | Priem et al. | 395/134 |
| 5,261,064 | 11/1993 | Wyland | 395/421.01 |
| 5,390,333 | 2/1995 | Pritt et al. | 395/750 |
| 5,423,019 | 6/1995 | Lin | 395/462 |

OTHER PUBLICATIONS

"The Metaflow Architecture", © 1991 IEEE, Jun. IEEE Micro, Authors: Val Popescu, Merle Schultz, John Spracklen, Gary Gibson, Bruce Lightner, David Isaman, pp. 10–13, 63–73.

*Primary Examiner*—Matthew M. Kim
*Attorney, Agent, or Firm*—Blakely, Sokoloff, Taylor & Zafman

[57] ABSTRACT

A CPU is coupled to the cache memory over a system bus having a width of 64 data bits. The cache memory is organized into a left array and a right array, with data bits stored as lines of data wherein each line is comprised of 256 data bits defined into four data "chunks" of 64 bits each. Each memory read access by the CPU to the cache results in a complete line of data to be read in the cache. The chunks comprising the line of data are coupled over an internal cache bus to a "chunk" multiplexor. The chunk multiplexor stages the data chunks in an order defined by the CPU, and sequentially send the data chunks over the system bus to the CPU. The chunks are organized as high and low order chunks. The multiplexor includes a first multiplexor for receiving the high order chunks and a second multiplexor for receiving the low order chunks. Latches are provided which are coupled to the first and second multiplexors to receive the high order chunks upon the receipt of a first clock signal, and the low order chunks upon the receipt of a second clock signal. Enabling signals are provided to the latches such that the high order and low order chunks are coupled to the system bus in a sequential order which is determined by the CPU.

30 Claims, 5 Drawing Sheets

CACHE MEMORY HAVING A MULTIPLEXOR ASSEMBLY FOR ORDERING OUTPUT ON A DATA CHUNK BASIS

This is a continuation of application Ser. No. 08/175,199, filed Dec. 28, 1993, now abandoned.

BACKGROUND OF THE INVENTION

1. Field of the Invention

The present invention relates to memory systems for computers and, more particularly, new cache memory systems for increasing data access speed and efficiency.

2. Art Background

In many data processing systems, it is common to utilize a high speed buffer memory, referred to as a "cache" coupled to a central processing unit (CPU) to improve the average memory access time for the process. The use of a cache is based upon the premise that over time, a data processing system will access certain localized areas of memory with high frequency. The cache typically contains a subset of the complete data set disposed in the main memory, and can be accessed very quickly by the CPU without the necessity of reading the data locations in the main memory.

Many cache systems use multiple levels of cache memories, with data transfer between them. For example, the level 1 cache closest to the CPU may request data from a larger level 2 cache. In order to improve efficiency, the minimum amount of data transferred (referred to as a "line") may contain 64 bits and a line may consist of 256 bits. Although the CPU has developed the ability to handle more bits, most data bus systems coupling the CPU with memory or coupling between memories comprise a series of data lines less than the number of bits in a line. Accordingly, computer systems in which the data transferred constitutes more bits than the width of the data bus must multiplex the data on the bus.

As will be described, the present invention provides methods and apparatus for multiplexing "chunks" of data a full line of data to be read from a cache or other memory.

SUMMARY OF THE INVENTION

The present invention provides an improved cache memory for providing data to a central processing unit (CPU). A CPU is coupled to the cache memory over a system bus having a width of 64 data bits. The cache memory is organized into a left array and a right array, with data bits stored as lines of data wherein each line is comprised of 256 data bits defined into four data "chunks" of 64 bits each. Each memory read access by the CPU to the cache results in a complete line of data to be read in the cache. The chunks of the line of data are coupled over an internal cache bus to a "chunk" multiplexor. The chunk multiplexor stages the data chunks in an order defined by the CPU, and sequentially send the data chunks over the system bus to the CPU. The chunks are organized as high and low order chunks. The multiplexor includes a first multiplexor for receiving the high order chunks and a second multiplexor for receiving the low order chunks. Latches are provided which are coupled to the first and second multiplexors to receive the high order chunks upon receipt of a first clock signal, and the low order chunks upon receipt of a second clock signal. Enabling signals are provided to the latches such that the high order and low order chunks are coupled to the system bus in a sequential order which is determined by the CPU.

BRIEF DESCRIPTION OF THE DRAWINGS

The present invention is illustrated by way of example and not limitation in the figures of the accompanying drawings in which like references indicate similar elements, and in which.

DETAILED DESCRIPTION OF THE INVENTION

An improved cache memory having a data buffer for memory multiplexing is disclosed. In the following description, for purposes of explanation, specific architectures, bus widths and components are set forth to provide a thorough understanding of the present invention. However, it will be apparent to one skilled in the art that the present invention may be practiced without these specific details. In other instances, well known circuits are shown in block diagram form in order not to obscure the present invention unnecessarily.

Figure 1:
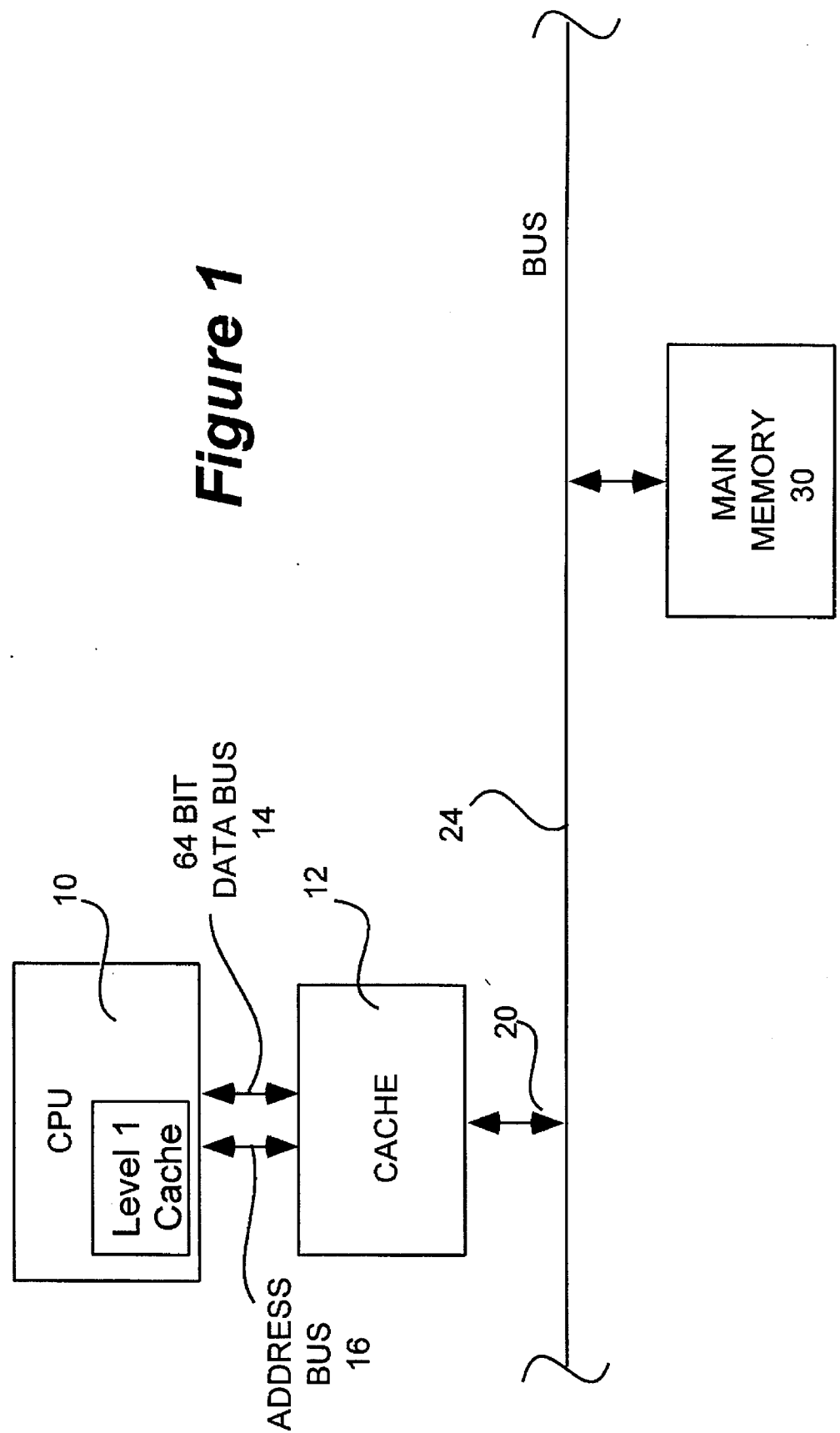
FIG. 1 is a block diagram conceptually illustrating one data processing system which employs the teachings of the present invention.

With reference to FIG. 1, a computer system is illustrated which incorporates the teachings of the present invention. As shown, a central processing unit (CPU) 10 is coupled to a cache memory 12 over a data bus 14 and an address bus 16. The cache memory 12 is further coupled over an intermediary bus 20 to a main system bus 24. A main memory 30 is also illustrated coupled to the system bus 24, as are other data processing devices (not shown) which are well known in the art. In operation, the CPU 10 reads and writes data to both the cache memory 12 as well as the main memory 30.

In the presently preferred embodiment, and as will be described more fully below, cache memory 12 includes a data array in which a full line of data is read from the cache by the CPU 10 for every read cycle. A "line" of data consists of 256 bits of data plus 32 error correction bits (ECC) for a total of 288 bits. A line is considered in this description to comprise four "chunks" of 64 data bits plus 8 ECC bits (72 bits total). In the embodiment illustrated in FIG. 1, data bus 14 comprises a 64 bit wide data bus, and therefore, a read operation by CPU 10 to read data from cache 12 results in 4 "chunks" of 64 bit data to be multiplexed to the CPU 10 where the chunk order is determined at the time of the read inquiry. As will be described, a multiplexor disposed within cache 12 sends data chunks to the CPU 10 in the correct order and ensures that the data is not overwritten before it is multiplexed over data bus 14.

Figure 2:
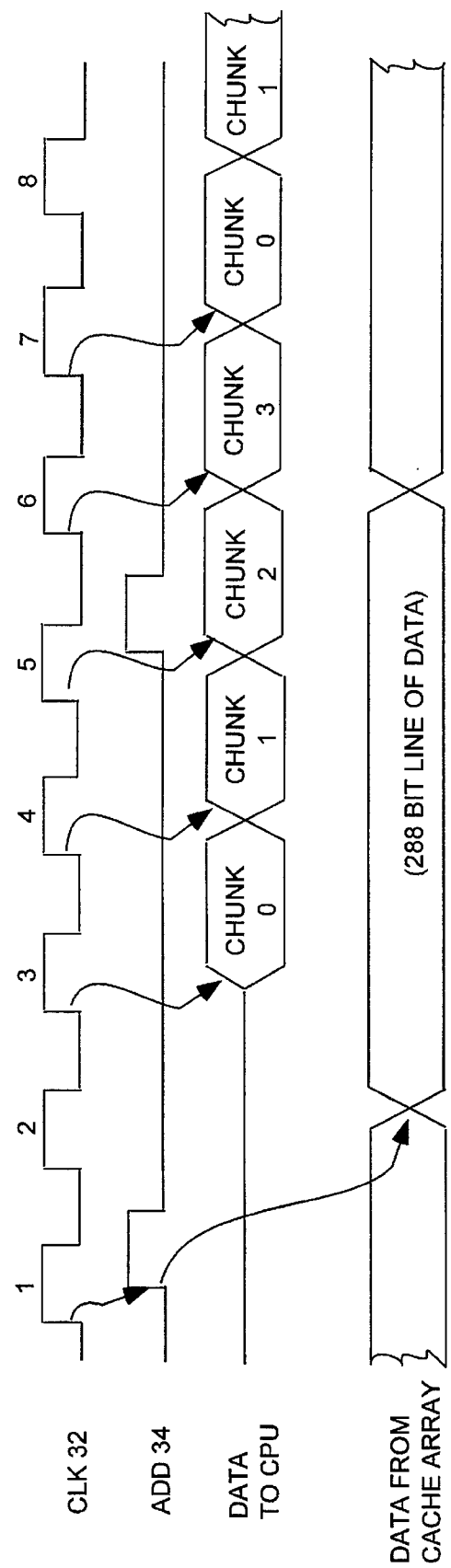
FIG. 2 illustrates a timing diagram for providing multiplexing of data stored in a cache array to the CPU in a series of data "chunks".

Referring now to FIG. 2, a timing diagram is provided to illustrate the basic operation of the present invention. Shown, a clock signal 32 originates from either an internal clock within CPU 10 or external system clock. As is well known in the art, the system clock 32 is also provided to the cache 12 as well as other data processing devices coupled to the system bus 24. An address strobe signal 34 is provided by the CPU 10 along with address bus 16 to the cache 12.

Also illustrated in FIG. 2, is the timing diagram for data coupled from cache 12 to the CPU 10 over the data bus 14. Once CPU 10 requests data through a read operation from cache 12, the data bus 14, if it is tri-stated will be then become active. As previously described, a line of data consists of 256 bits of data plus 32 ECC bits. The cache reads an entire line of data (288 bits) and multiplexes the data on data bus 14 in four data chunks. This operation is illustrated in FIG. 2 wherein subsequent to the address strobe signal 34 (being provided to the cache 12), data from the cache array (288) bits is read from the cache array and coupled to a multiplexor within the cache. The multiplexor, to be described below, transmits the data to the CPU 10 in four chunks per data line which is docked on the falling edge of the clock 32. In the example illustrated in FIG. 2, chunk 0 comprises the first 64 data bits plus 8 ECC bits (72 bits total), which is followed by chunk 1, chunk 2, and chunk 3, and then another chunk 0 which corresponds to a subsequent read operation. In the present embodiment, the receipt of the address strobe signal 34 by cache 12 initiates the read operation of the data line within the cache 12. As will be described, the data chunks are then staged within the cache 12 to be multiplexed in accordance with the teachings of the present invention.

Figure 3:
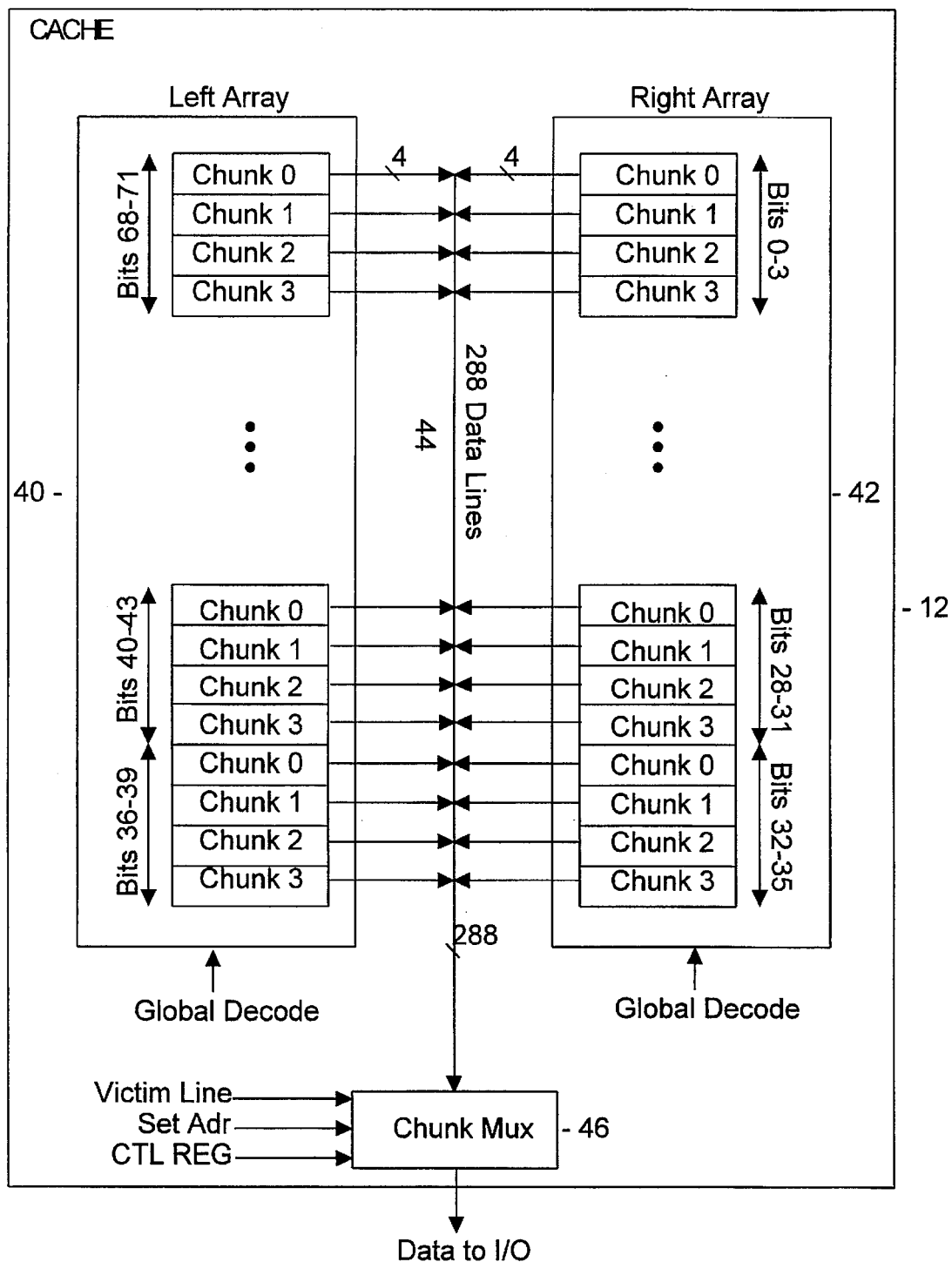
FIG. 3 is a block diagram of the cache architecture of the present invention.

Referring now to FIG. 3, the architecture of the present inventions' cache memory 12 is illustrated in block diagram form. As illustrated, cache 12 includes a left array 40 and a right array 42. A central bus 44 couples data from both the left array 40 and the right array 42 to a chunk multiplexor (MUX) 46. As previously described, each line of data is comprised of four chunks of 64 data bits plus 8 ECC bits (72 bits total). The line therefore comprises a total of 256 bits of data plus 32 ECC bits (for a total of 288 bits). As illustrated in FIG. 3, bus 44 comprises a corresponding 288 data lines to accommodate the 288 bits. Also as shown in FIG. 3, the memory of cache 12 is mapped in chunks of 64 data bits (plus 8 ECC bits) such that the chunks are numbered 0–3 for each line (288 bits) comprising the memory array.

Referring once again to FIG. 2 in conjunction with FIG. 3, the data from the cache array (288 bits) is coupled from the left array 40 and right array 42 to bus 44 and received by the chunk MUX 46. In operation, an address generated by an I/O section and provided by CPU 10 is coupled to the left and right arrays such that word lines are selected. The word lines activate columns within the array and sense amplifiers (not shown), such that the data is coupled from the array to the chunk MUX 46 where it is staged. It will be appreciated that it is important to insure that there be no overwrite of data, since during repetitive read cycles it is possible that an additional line of data from a subsequent address provided by the CPU will be forwarded to the chunk MUX 46 prior to all of the chunks from a prior word line read operation being transmitted over the data bus 14 to the CPU 10.

Figure 4A:
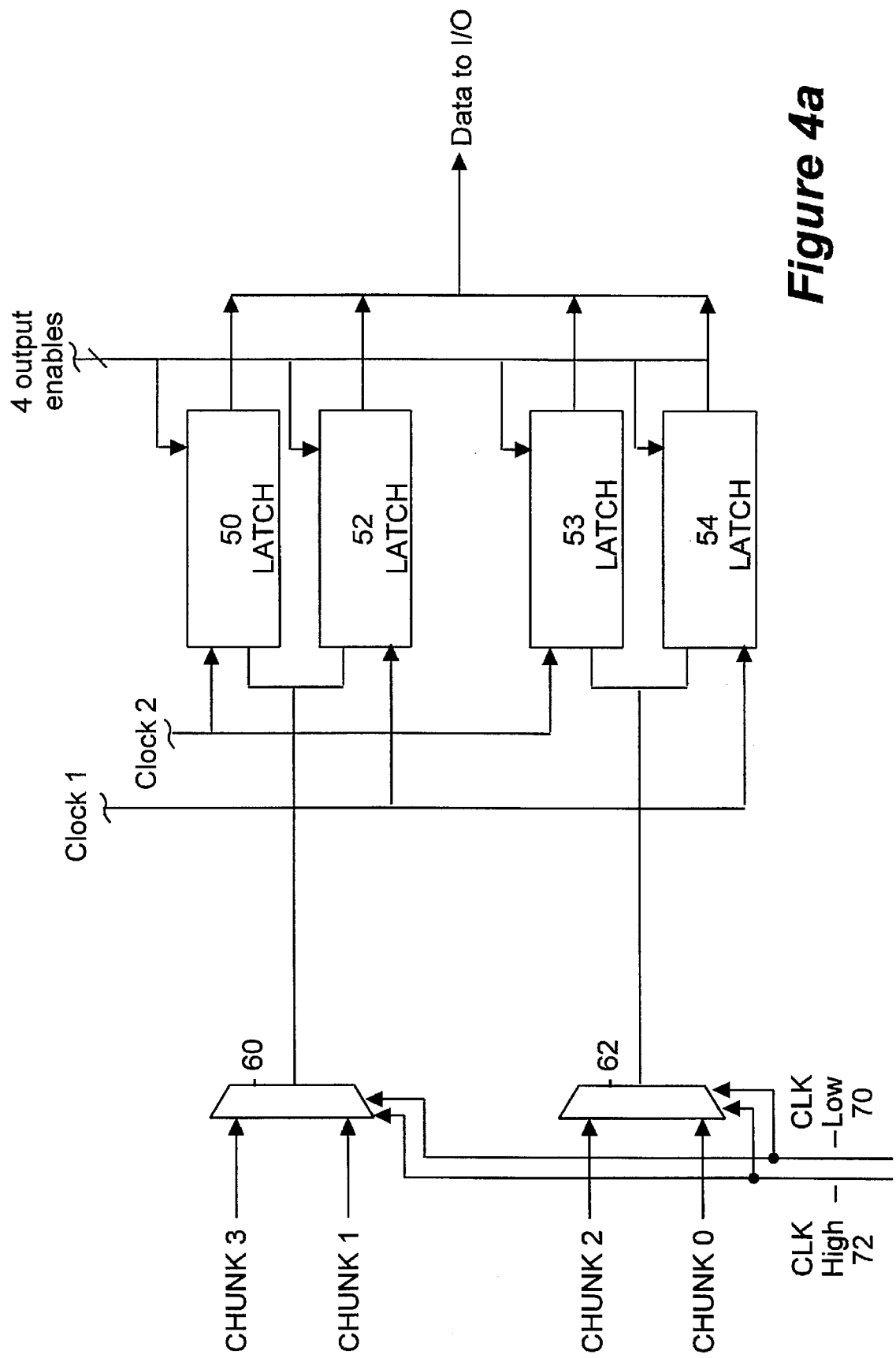
FIG. 4a illustrates the present inventions' use of latches for multiplexing the various data chunks onto the data bus.

Referring now to FIG. 4a, a block diagram of the chunk MUX 46 is illustrated. Taught by the present invention, the chunk MUX 46 sends data chunks to the CPU 10 in the order which is requested by the CPU 10, and ensures that the data is not written over before it is multiplexed to the CPU 10 over the data bus 14. As will be described, the chunks (0–3) are not latched at once, and only the time critical two chunks (the first two chunks requested) are latched first. The inputs to the chunk MUX 46 logic illustrated in FIG. 4a are held stable through the array and the data latches in the array (left array 40 and right array 42). As illustrated in FIG. 4a, the chunk MUX 46 logic includes latches 50, 52, 53 and 54. A two-to-one multiplexor 60 and 62 is provided to receive the data chunks. In the presently preferred embodiment, data chunks 1 and data chunks 3 are coupled to multiplexor 60. Data chunks 0 and data chunks 2 are coupled to multiplexor 62. Moreover, although not shown, within each latch 50–54 is a latch with an output enable signal. As illustrated, the output from each latch is wired "OR" together. As will be appreciated, the control logic (not shown) for the present invention ensures that only one of the latches 50–54 is enabled at any one time. The enablement of one latch results in the other 3 latches being disabled.

Also illustrated in FIG. 4a are two dock lines (dock 1 and dock 2). As shown, clock 1 loads latches 52 and 54 with the first two chunks and clock 2 loads latches 50 and 53 with the second two chunks. The CPU 10 determines which chunk it desires to receive first (the "critical" chunk) and the successive chunks will follow in a predefined order. There are four possible combinations: (0,1,2,3), (1,0,3,2), (2,3,0,1), and (3,2,1,0). At the beginning of a read cycle, steering logic determines whether the low order chunks (0,1) are critical (required first) or the high order chunks (2,3). The signals which do the steering of the data chunks through multiplexors 60 and 62 are dock signals coupled over a dock low line 70 and dock high line 72. The control logic provides signals over dock low line 70 and clock high line 72. Signals provided on clock low line 70 provide the low order chunks (0,1) to the respective latches, and a clock high signal (72) results in the selection and steering of the high order chunks (2,3) into the chunk MUX multiplexor 46. If dock low 70 is enabled first, then clock 1 will latch chunk 0 in latch 54 and chunk 1 in latch 52. Signal dock 2 will then latch chunk 2 and chunk 3 in latch 53 and 50 respectively.

Figure 4B:
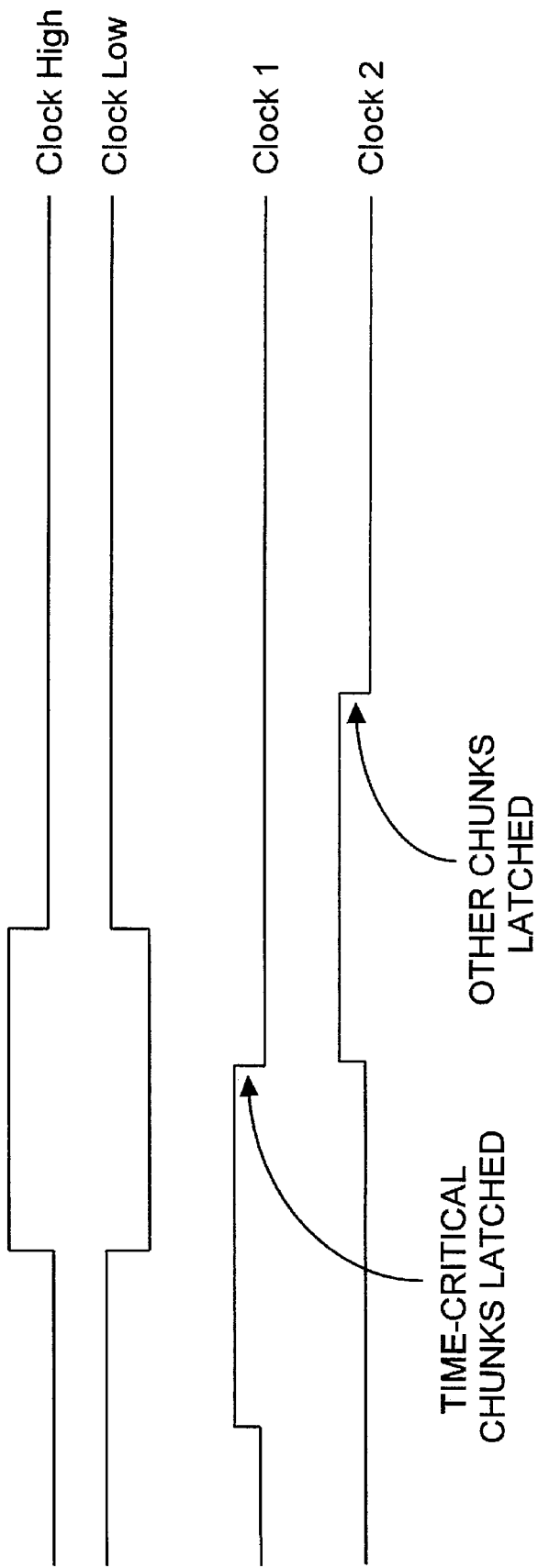
FIG. 4b illustrates a timing diagram of the present inventions' multiplexing based on high or low data bits.

A timing diagram illustrating the operation of dock 1, dock 2, clock high 72, and dock low 70, and the respective multiplexing of low and high order chunks is illustrated in FIG. 4b. Therefore, it will be appreciated that the present invention utilizes four clock signals as part of the chunk MUX 46, namely, clock 1, dock 2, dock high 72 and dock low 70. Finally, the present invention offers total flexibility with the order in which the data chunks are multiplexed onto the data bus 14 for receipt by the CPU 10. It will be appreciated that the steering logic provides either a clock high 72 signal or a clock low 70 depending on the order in which the CPU 10 desires to receive the data chunks comprising the line of data from the cache array. Next, the first two chunks (critical chunks) are latched into latches 52 and 54 by dock 1. Then the second two chunks (non-critical chunks) are latched into latches 50 and 53 by clock 2.

The control logic of the present invention determines the order in which to enable the latches (50–54) so that the chunks are burst out to the data bus 14 in the correct order. The four output enables which enable the latches 50–54 are further provided by the control logic. One feature of the present invention is that a given latch (50–54) will never be reloaded twice within any four cycle period to prevent overwriting of data. For example, if there are two back to back bursts with the following chunk order (0,1,2,3) (2,3, 0,1) chunks 2 and 3 will be loaded into different latches in the second access than in the first access to prevent overwriting.

Although the present invention has been described with reference to FIGS. 1–4, it will be appreciated that the figures are for illustration only, and that the present invention may be used in numerous other cache and memory related applications.

We claim:

1. A computer system including a central processing unit (CPU) coupled to a memory over a bus having a predefined bus width, said memory comprising:

a memory array for storing data comprising data bits, said memory storing said data within said array in data lines, each of said data lines being divided into a plurality of data chunks having a predefined number of said data bits corresponding to the width of said bus to facilitate retrieval of the data line;

a multiplexor assembly coupled to said memory array and said bus for sending data between said memory array and said CPU over said bus, said multiplexors assembly comprising a plurality of multiplexors and a plurality of latches for receiving in parallel data chunks of a line of said data from said array, selectively latching said received data chunks by one predetermined subset of at least two of said received data chunks at a time, and serially outputting the at least two data chunks of a latched predetermined subset in a variable manner, under the control of said CPU.

2. The computer system as defined by claim 1 wherein said predetermined subsets of data chunks of a line include a high order predetermined subset having a first and a second data chunk and a low order predetermined subset having a third and a fourth data chunk.

3. The computer system as defined by claim 2 wherein said multiplexor assembly includes:

a first multiplexor coupled to said memory array for receiving in parallel said first and third data chunks of said high and low order predetermined subsets respectively, and selecting either said first or said third data chunk under the control of said CPU;

a second multiplexor coupled to said memory array for receiving in parallel said second and fourth data chunks of said high and low order predetermined subsets respectively, and selecting either said second or said fourth data chunk under the control of said CPU; and a plurality of latches coupled to said first and second multiplexors for latching said first and second data chunks of said high order predetermined subset when said first and second multiplexors select said first and second data chunks, and then serially outputting said first and second data chunks in a variable manner, and for latching said third and fourth data chunks of said lower order predetermined subset when said first and second multiplexors select said third and fourth data chunks, and then serially outputting said third and fourth data chunks in a variable manner, all under the control of said CPU.

4. The computer system as defined by claim 3 wherein said plurality of latches include a first and a second latch coupled to said first and second multiplexors correspondingly for receiving either said first and second data chunks when said first and second multiplexors select said first and second data chunks, or said third and fourth data chunks when said first and second multiplexors select said third and fourth data chunks.

5. The computer system as defined by claim 4 wherein said plurality of latches further include a third and a fourth latch coupled to said first and second multiplexors correspondingly for latching either said first and second data chunks when said first and second multiplexors select said first and second data chunks, or said third and fourth data chunks when said first and second multiplexors select said third and fourth data chunks.

6. The computer system as set forth in claim 5, wherein said computer system further includes clock generation means for generating either a first or a second clock signal, said clock generation means coupling either said first clock signal to said first and second latches or said second clock signal to said third and fourth latches, such that upon receipt of said first clock signal said first and second latches latch said first and second data chunks respectively, when said first and second data chunks are selected by said first and second multiplexors, or latch said third and fourth data chunks respectively, when said third and fourth data chunks are selected by said first and second multiplexors, and upon receipt of said second clock signal said third and fourth latches latch said first and second data chunks respectively, when said first and second multiplexors select said first and second data chunks, and latch said third and fourth data chunks, respectively, when said first and second multiplexors select said third and fourth data chunks.

7. The computer system as defined by claim 3 further including clock generation means for the generation of either a first or a second clock signal, said clock generation means coupling either said first or said second clock signal to said first and second multiplexors such that upon receipt of said first clock signal said first and second multiplexors select said first and second data chunks, respectively, and upon receipt of said second clock signal said first and second multiplexors select said third and fourth data chunks, respectively.

8. The computer system as defined by claim 3 wherein said computer system further includes clock generation means for generating a first clock signal, said clock generation means coupling said first clock signal to a first and a second of said plurality of latches, such that upon receipt of said first clock signal said first and second latches latch said first and second data chunks, respectively, when said first and second multiplexors select said first and second data chunks, or latch said third and fourth data chunks, respectively, when said first and second multiplexors select said third and fourth data chunks.

9. The computer system as set forth in claim 8, wherein said computer system further includes enabling means for serially enabling either said first and second latches to output either said latched first and second or said third and fourth data chunks, or serially enabling said second and first latches to output either said latched second and first or said fourth and third data chunks.

10. A cache memory for storing data coupled to a central processing unit (CPU) over a system bus having a predefined bus width, said cache memory comprising:

a memory array for storing data comprising data bits, said memory storing said data within said array in data lines, each of said data lines being divided into a plurality of data chunks having a predefined number of said data bits corresponding to the width of said bus to facilitate retrieval of the data line;

a multiplexor assembly coupled to said memory array over a cache bus, said multiplexor assembly receiving data from said memory array and sending said data to said CPU over said system bus, said multiplexor assembly comprising a plurality of multiplexors and a plurality of latches for receiving in parallel data chunks of a line of said data from said array, selectively latching said received data chunks by one predetermined subset of at least two of said received data chunks at a time, and serially outputting the at least two data chunks of a latched predetermined subset in a variable manner, under the control of said CPU.

11. The cache memory as defined by claim 10 wherein said memory array comprises a right array and a left array.

12. The cache memory as defined by claim 11 wherein said predetermined subsets of data chunks of a line include a high order predetermined subset having a first and a second data chunk and a low order predetermined subset having a third and fourth data chunk.

13. The cache memory as defined by claim 12 wherein said multiplexor assembly includes:
    a first multiplexor coupled to said memory array for receiving in parallel said first and third data chunks of said high and low order predetermined subsets respectively, and selecting either said first or said third data chunk under the control of said CPU;
    a second multiplexor coupled to said memory array for receiving in parallel said second and fourth data chunks of said high and low order predetermined subsets respectively, and selecting either said second or fourth data chunk under the control of said CPU;
    a plurality of latches coupled to said first and second multiplexors for latching said first and second data chunks of said high order predetermined subset when said first and second multiplexors select said first and second data chunks, and then serially outputting said first and second data chunks in a variable manner, and for latching said third and fourth data chunks of said lower order predetermined subset when said first and second multiplexors select said third and fourth data chunks, and then serially outputting said third and fourth data chunks in a variable manner, all under the control of said CPU.

14. The cache memory as defined by claim 13 wherein said plurality of latches include a first and a second latch coupled to said first and second multiplexors correspondingly for receiving either said first and second data chunks when said first and second multiplexors select said first and second chunks, or said third and fourth data chunks when said first and second multiplexors select said third and fourth data chunks.

15. The cache memory as defined by claim 14 wherein said plurality of latches further include a third and a fourth latch coupled to said first and second multiplexors correspondingly for latching either said first and second data chunks when said first and second multiplexors select said first and second data chunks, or said third and fourth data chunks when said first and second multiplexors select said third and fourth data chunks.

16. The cache memory as set forth in claim 15, wherein said cache memory further includes clock generation means for generating either a first or a second clock signal, said clock generation means coupling either said first clock signal to said first and second latches or said second clock signal to said third and fourth latches, such that upon receipt of said first clock signal said first and second latches latch said first and second data chunks respectively, when said first and second data chunks are selected by said first and second multiplexors, or latch said third and fourth data chunks respectively, when said third and fourth data chunks are selected by said first and second multiplexors, and upon receipt of said second clock signal said third and fourth latches latch said first and second data chunks respectively, when said first and second multiplexors select said first and second data chunks, and latch said third and fourth data chunks, respectively, when said first and second multiplexors select said third and fourth data chunks.

17. The cache memory as defined by claim 13 further including clock generation means for the generation of either a first or a second clock signal, said clock generation means coupling either said first or said second clock signal to said first and second multiplexors such that upon receipt of said first clock signal said first and second multiplexors select said first and second data chunks, respectively, and upon receipt of said second clock signal said first and second multiplexors select said third and fourth data chunks, respectively.

18. The cache memory as defined by claim 13 wherein said computer system further includes clock generation means for generating a first clock signal, said clock generation means coupling said first clock signal to a first and a second of said plurality of latches, such that upon receipt of said first clock signal said first and second latches latch said first and second data chunks, respectively, when said first and second data chunks are selected by said first and second multiplexors, or latch said third and fourth data chunks, respectively, when said third and fourth data chunks are selected by said first and second multiplexors.

19. The cache memory as set forth in claim 18, wherein said cache memory further includes enabling means for serially enabling either said first and second latches to output said latched first and second or third and fourth data chunks, or serially enabling said second and first latches to output either said latched second and first or fourth and third data chunks.

20. The cache memory as defined by claim 10 wherein each of said lines of data comprise 256 data bits, and each of said data chunks comprising 64 data bits.

21. The cache memory as defined by claim 10 wherein each of said lines of data comprise 256 data bits and 32 ECC bits, and each of said data chunks comprise 64 data bits plus 8 ECC bits.

22. In a computer system including a central processing unit (CPU) coupled to a memory over a system bus having a predefined bus width, a method for reading data from said memory by said CPU comprising the steps of:
    storing data comprising data bits in a memory array of said memory, said memory storing said data within said memory array in data lines, each of said data lines being divided into a plurality of data chunks having a predefined number of said data bits corresponding to the width of said bus to facilitate retrieval of the data line;
    sending data from said memory array to said CPU over said bus through a multiplexor assembly disposed in between and coupled to said memory array and said bus, said multiplexor comprising a plurality of multiplexors and a plurality of latches first receiving in parallel data chunks of a line of said data from said array, then latching said received data chunks one predetermined subset of at least two of said received data chunks at a time, and serially outputting the at least two data chunks of a latched predetermined subset in a variable manner, responsive to the control of said CPU.

23. The method as defined by claim 22 wherein said predetermined subsets of data chunks of a line include a high order predetermined subset having a first and a second data chunk and a low order predetermined subset having a third and a fourth data chunk.

24. The method as defined by claim 23 wherein said sending of data through said multiplexor assembly includes:
    receiving in parallel by a first multiplexor coupled to said memory array said first and third data chunks of said high and low order predetermined subsets respectively, and selecting either said first or said third data chunk responsive to the control of said CPU;
    receiving in parallel by a second multiplexor coupled to said memory array said second and fourth data chunks of said high and low order predetermined subsets respectively, and selecting either said second or said fourth data chunk responsive to the control of said CPU; and latching by a plurality of latches coupled to said first and second multiplexors said first and second data chunks of said high order predetermined subset when said first and second multiplexors select said first and second data chunks, and then serially outputting said first and second data chunks in a variable manner, and latching by said plurality of latches said third and fourth data chunks of said lower order predetermined subset when said first and second multiplexors select said third and fourth data chunks, and then serially outputting said third and fourth data chunks in a variable manner, responsive to the control of said CPU.

25. The method as defined by claim 24 wherein said latching by said plurality of latches include latching by a first and a second latch correspondingly coupled to said first and second multiplexors either said first and second data chunks when said first and second multiplexors select said first and second data chunks, or said third and fourth data chunks when said first and second multiplexors select said third and fourth data chunks.

26. The method as defined by claim 25 wherein said latching by said plurality of latches include latching by a third and a fourth latch correspondingly coupled to said first and second multiplexor either said first and second data chunks when said first and second multiplexors select said first and second data chunks, or said third and fourth data chunks when said first and second multiplexors select said third and fourth data chunks.

27. The method as set forth in claim 26, wherein said method further includes generating either a first or a second clock signal by clock generation means, and coupling either said first clock signal to said first and second latches or said second clock signal to said third and fourth latches, such that upon receipt of said first clock signal said first and second latches latch said first and second data chunks respectively, when said first and second data chunks are selected by said first and second multiplexors, or latch said third and fourth data chunks respectively, when said third and fourth data chunks are selected by said first and second multiplexors, and upon receipt of said second clock signal said third and fourth latches latch said first and second data chunks respectively, when said first and second multiplexors select said first and second data chunks, and latch said third and fourth data chunks, respectively, when said first and second multiplexors select said third and fourth data chunks.

28. The method as defined by claim 24 further including the generation of either a first or a second clock signal by clock generation means, and coupling of either said first or said second clock signal to said first and second multiplexors such that upon receipt of said first clock signal said first and second multiplexors select said first and second data chunks, respectively, and upon receipt of said second clock signal said first and second multiplexors select said third and fourth data chunks, respectively.

29. The method as defined by claim 24 wherein said method further includes the generation of a first clock signal by clock generation means, said first clock signal being coupled to a first and a second of said plurality of latches, such that upon receipt of said first clock signal said first and second latches latch said first and second data chunks, respectively, when said first and second data chunks are selected by said first and second multiplexors, or latch said third and fourth data chunks, respectively, when said third and fourth data chunks are selected by said first and second multiplexors.

30. The method as set forth in claim 29, wherein said method further includes serially enabling either said first and second latches to output said latched first and second or third and fourth data chunks, or serially enabling said second and first latches to output either said latched second and first or fourth and third data chunks.

* * * * *